(12) United States Patent  (10) Patent No.: US 12,453,868 B2
Yang et al.  (45) Date of Patent: Oct. 28, 2025

(54) PATIENT VOLUME SEGMENTATION APPARATUS AND METHOD

(71) Applicant: Varian Medical Systems Particle Therapy GmbH & Co. KG, Troisdorf (DE)

(72) Inventors: Xinhui Yang, Oberrohrdorf (CH); Armel Rosselet, Baden (CH); Daniel von Büren, Sierentz (FR)

(73) Assignee: Varian Medical Systems Particle Therapy GmbH & Co. KG, Troisdorf (DE)

( * ) Notice: Subject to any disclaimer, the term of this patent is extended or adjusted under 35 U.S.C. 154(b) by 266 days.

(21) Appl. No.: 18/208,425

(22) Filed: Jun. 12, 2023

(65) Prior Publication Data
US 2024/0408409 A1  Dec. 12, 2024

(51) Int. Cl.
A61N 5/10 (2006.01)
G06T 5/50 (2006.01)
(Continued)

(52) U.S. Cl.
CPC .............. A61N 5/1039 (2013.01); G06T 5/50 (2013.01); G06T 7/0012 (2013.01); G06T 7/10 (2017.01);
(Continued)

(58) Field of Classification Search
CPC ........ G06V 20/64; G06V 40/14; G06V 10/50; G06V 10/44; G06V 2201/03; G06T 7/0012; G06T 5/50; G06T 7/10; G06T 2207/10072; G06T 2207/10116; G06T 2211/404; G06T 15/08; G06T 7/0014; G06T 2207/20084; G06T 2207/30004; G06T 2207/10124; G06T 2207/10121; G06T 2207/10081; G06T 2207/10088; G06T 2207/20081;
(Continued)

(56) References Cited

U.S. PATENT DOCUMENTS 7,995,824 B2  8/2011 Yim
11,410,317 B2  8/2022 Paul
(Continued)

FOREIGN PATENT DOCUMENTS

CN  112509077 A  3/2021
EP  3746980 B1  8/2022

OTHER PUBLICATIONS

Coste, Eric et al.; 3D reconstruction of the encapsulating contour of arteriovenous malformations for radiosurgery using digital subtraction angiography; Int J Radiat Oncol Biol Phys May 1, 2001;50(1):247-55.
(Continued)

Primary Examiner — Irakli Kiknadze
(74) Attorney, Agent, or Firm — Fitch, Even, Tabin & Flannery LLP

(57) ABSTRACT

By one approach, a control circuit accesses planning computed tomography image information for a particular patient. The control circuit also accesses two-dimensional digital subtraction angiography image information for the particular patient. The control circuit then fuses the planning computed tomography image information with the two-dimensional digital subtraction angiography image information to provide fused image information of the patient target volume.

20 Claims, 5 Drawing Sheets

(51) Int. Cl.
*G06T 7/00* (2017.01)
*G06T 7/10* (2017.01)

(52) U.S. Cl.
CPC ............... *G06T 2207/10072* (2013.01); *G06T 2207/10116* (2013.01); *G06T 2211/404* (2013.01)

(58) Field of Classification Search
CPC .......... G06T 2207/10104; G06T 19/20; G06T 11/60; G06T 11/001; G06T 1/20; G06T 15/005; G06T 1/60; G06T 7/11; G06T 2207/30008; G06T 2207/30101; G06T 2207/20112; G06T 2200/04; G06T 11/008; G06T 2211/412; G06T 2211/436; G06T 2207/30068; G06T 2207/10112; G06T 2207/20224; G06T 7/0016; G06T 7/35; A61N 5/1039; A61B 6/463; A61B 6/5294; A61B 6/466; A61B 6/5217; A61B 6/5205; A61B 6/465; A61B 5/055; A61B 6/032; A61B 5/7475; A61B 6/037; A61B 6/481; A61B 6/488; A61B 6/504; G16H 30/20; G16H 50/20; G16H 30/40; G16H 50/70; G16Z 99/00; G06F 3/147; G06F 18/24; G09G 5/363
USPC ......................................................... 378/65
See application file for complete search history.

(56) References Cited

U.S. PATENT DOCUMENTS

| | | | |
|---|---|---|---|
| 2008/0109013 A1* | 5/2008 | Fu ........................ | A61N 5/1049 600/407 |
| 2009/0005668 A1 | 1/2009 | West | |
| 2021/0370097 A1* | 12/2021 | Thomas ............... | A61N 5/1081 |
| 2022/0230310 A1 | 7/2022 | Xie | |
| 2022/0409929 A1* | 12/2022 | Rusanen .............. | A61N 5/1031 |
| 2023/0094681 A1* | 3/2023 | Lambin ................ | A61N 5/1071 600/1 |
| 2023/0095485 A1* | 3/2023 | Czeizler ................ | G16H 20/40 600/1 |
| 2024/0001139 A1* | 1/2024 | Kuusela ................ | A61N 5/045 |

OTHER PUBLICATIONS

Extended European Search Report from related European Patent Application No. 24180434.3 dated Nov. 18, 2024; 8 pages.
Liao, Rui et al.; A Review of Recent Advances in Registration Techniques Applied to Minimally Invasive Therapy; IEEE Transactions on Multimedia, vol. 15, No. 5, Aug. 31, 2013, pp. 983-1000; DOI: 10.1109/TMM.2013.2244869.

* cited by examiner

PATIENT VOLUME SEGMENTATION APPARATUS AND METHOD

TECHNICAL FIELD

These teachings relate generally to treating a patient's planning target volume with energy pursuant to an energy-based treatment plan and more particularly to segmenting one or more patient volumes to support development of an energy-based treatment plan.

BACKGROUND

The use of energy to treat medical conditions comprises a known area of prior art endeavor. For example, radiation therapy comprises an important component of many treatment plans for reducing or eliminating unwanted tumors. Unfortunately, applied energy does not inherently discriminate between unwanted material and adjacent tissues, organs, or the like that are desired or even critical to continued survival of the patient. As a result, energy such as radiation is ordinarily applied in a carefully administered manner to at least attempt to restrict the energy to a given target volume. A so-called radiation treatment plan often serves in the foregoing regards.

A radiation treatment plan typically comprises specified values for each of a variety of treatment-platform parameters during each of a plurality of sequential fields. Treatment plans for radiation treatment sessions are often automatically generated through a so-called optimization process. As used herein, "optimization" will be understood to refer to improving a candidate treatment plan without necessarily ensuring that the optimized result is, in fact, the singular best solution. Such optimization often includes automatically adjusting one or more physical treatment parameters (often while observing one or more corresponding limits in these regards) and mathematically calculating a likely corresponding treatment result (such as a level of dosing) to identify a given set of treatment parameters that represent a good compromise between the desired therapeutic result and avoidance of undesired collateral effects.

One or more patient volumes (such as the radiation target and one or more organs-at-risk) are generally identified to facilitate the foregoing optimization. Segmentation refers to identifying discrete patient structures including, but not limited to, target treatment volumes and organs-at-risk. Segmentation is sometimes accomplished by a human. While automated segmentation is making some inroads, some application settings are very challenging for even partial automation. For example, such can be the case when the patient target volume comprises an arteriovenous malformation.

In an arteriovenous malformation, arteries and veins are connected by a cluster of abnormally formed blood vessels. This tangled web of vessels disrupts the normal blood flow and oxygen exchange. Arteries within the arteriovenous malformation often carry high-pressure blood directly into veins, causing them to enlarge and become weakened over time. This can lead to various complications, such as bleeding, reduced oxygen supply to tissues, or the formation of blood clots. While radiation can serve to help treat such a condition, developing a radiation treatment plan can be hindered, at least in part, by the difficulty of segmenting the arteriovenous malformation.

BRIEF DESCRIPTION OF THE DRAWINGS

The above needs are at least partially met through provision of the patient volume segmentation apparatus and method described in the following detailed description, particularly when studied in conjunction with the drawings, wherein.

Figure 1:
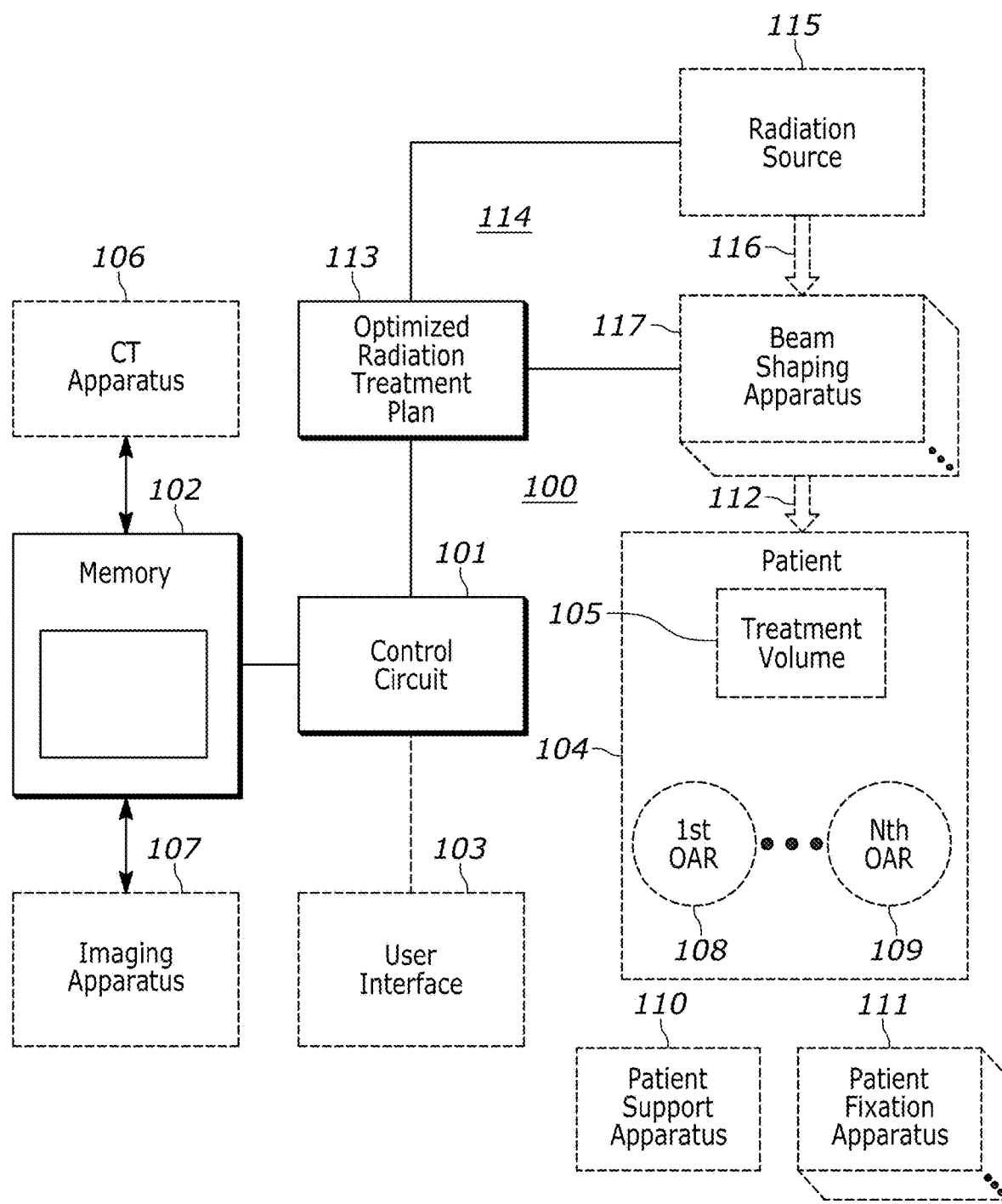
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments, segmentation of a variety of patient target volumes can be facilitated. This can include relatively difficult volumes, including but not limited to arteriovenous malformations located in such areas as within the patient's brain.

By one approach, a control circuit accesses planning computed tomography image information for a particular patient. The control circuit also accesses two-dimensional digital subtraction angiography image information for the particular patient. The control circuit then fuses the planning computed tomography image information with the two-dimensional digital subtraction angiography image information to provide fused image information of the patient target volume.

By one approach, these teachings will accommodate the control circuit generating the aforementioned two-dimensional digital subtractive angiography image information as a function of at least two ex-ray images. The latter may comprise, for example, two digital subtractive angiography images that are at least substantially orthogonal to one another.

By one approach, aforementioned planning computed tomography image information comprises, at least in part, segmented three-dimensional contours from corresponding computed tomography image information. Such a case, and as one example, fusing the planning computed tomography image information with the two-dimensional digital subtraction angiography image information by, at least in part, projecting the segmented three-dimensional contours into two-dimensional contours upon the two-dimensional digital subtraction angiography image information.

By one approach, the aforementioned two-dimensional digital subtraction angiography image information for the particular patient includes at least one closed two-dimensional contour surrounding an image of the patient target volume on each of at least two two-dimensional digital subtraction angiography images.

By one approach, fusing the planning computed tomography image information with the two-dimensional digital subtraction angiography image information comprises, at least in part, and for each image of x-ray and planning computed tomography images, effecting a registration that are between them.

By one approach, these teachings will accommodate the control circuit presenting simultaneously on an interactive user display, at least two digital subtraction angiography images that each include pre-delineated two-dimensional guide structures that correspond to the patient target volume and at least one pipeline projection along with at least three computed tomography images. By one approach, the planning computed tomography images include an axial image, a sagittal image, and a coronal image. By one approach, each of the planning computed tomography images includes a three-dimensional guide box that is reconstructed from two-dimensional guide contours from at least two of the digital subtraction angiography images.

Since a digital subtraction angiography image series provide unique real-time vessel feeding and drainage information, digital subtraction angiography has been employed previously for arteriovenous malformation target identification. Unfortunately, two-dimensional digital subtraction angiography has inherent limitations as a treatment planning procedure. For example, digital subtraction angiography is not able to provide accurate three-dimensional target information because of its two-dimensional nature. The three-dimensional target volume calculated using a pair of digital subtraction angiography images is typically the intersection volume of a pair of two-dimensional projections, based on contours delineated on the pair of radiographs. Note that given two projection contours, such a defined three-dimensional target volume is just one of the possible volumes corresponding to those two-dimensional projections. Thus, the resultant three-dimensional target volume usually does not represent the true arteriovenous malformation shape, especially for concave and irregular targets. Resultant errors, with both significant overestimation and underestimation of arteriovenous malformations, have been reported.

The present teachings, however, offer an effective approach for fusing two-dimensional digital subtraction angiography images and planning computed tomography images to accurately segment an arteriovenous malformations target volume in an interactive way in the planning computed tomography image according to the nidus information from the two-dimensional digital subtraction angiography image series. Accurate segmentation, in turn, help ensure a more efficacious radiation treatment plan optimization process and an improved patient outcome.

These and other benefits may become clearer upon making a thorough review and study of the following detailed description. Referring now to the drawings, and in particular to FIG. 1, an illustrative apparatus 100 that is compatible with many of these teachings will first be presented.

In this particular example, the enabling apparatus 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

The control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

In addition to information such as optimization information for a particular patient (including but not limited to planning computed tomography image information and two-dimensional digital subtraction angiography image information) and information regarding a particular radiation treatment platform as described herein, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

By one optional approach the control circuit 101 also operably couples to a user interface 103. This user interface 103 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

If desired the control circuit 101 can also operably couple to a network interface (not shown). So configured the control circuit 101 can communicate with other elements (both within the apparatus 100 and external thereto) via the network interface. Network interfaces, including both wireless and non-wireless platforms, are well understood in the art and require no particular elaboration here.

By one approach, a computed tomography apparatus 106 and/or other imaging apparatus 107 as are known in the art can source some or all of any desired patient-related imaging information including planning computed tomography image information and other x-ray images as described herein.

In this illustrative example the control circuit 101 is configured to ultimately output an optimized energy-based treatment plan (such as, for example, an optimized radiation treatment plan 113). This energy-based treatment plan typically comprises specified values for each of a variety of treatment-platform parameters during each of a plurality of sequential exposure fields. In this case the energy-based treatment plan is generated through an optimization process, examples of which are provided further herein.

By one approach the control circuit 101 can operably couple to an energy-based treatment platform 114 that is configured to deliver therapeutic energy 112 to a corresponding patient 104 having at least one treatment volume 105 and also one or more organs-at-risk (represented in FIG. 1 by a first through an Nth organ-at-risk 108 and 109) in accordance with the optimized energy-based treatment plan 113. These teachings are generally applicable for use with any of a wide variety of energy-based treatment platforms/apparatuses. In a typical application setting the energy-based treatment platform 114 will include an energy source such as a radiation source 115 of ionizing radiation 116.

By one approach this radiation source 115 can be selectively moved via a gantry along an arcuate pathway (where the pathway encompasses, at least to some extent, the patient themselves during administration of the treatment). The arcuate pathway may comprise a complete or nearly complete circle as desired. By one approach the control circuit 101 controls the movement of the radiation source 115 along that arcuate pathway, and may accordingly control when the radiation source 115 starts moving, stops moving, accelerates, de-accelerates, and/or a velocity at which the radiation source 115 travels along the arcuate pathway.

As one illustrative example, the radiation source 115 can comprise, for example, a radio-frequency (RF) linear particle accelerator-based (linac-based) x-ray source. A linac is a type of particle accelerator that greatly increases the kinetic energy of charged subatomic particles or ions by subjecting the charged particles to a series of oscillating electric potentials along a linear beamline, which can be used to generate ionizing radiation (e.g., X-rays) 116 and high energy electrons.

A typical energy-based treatment platform 114 may also include one or more support apparatuses 110 (such as a couch) to support the patient 104 during the treatment session, one or more patient fixation apparatuses 111, a gantry or other movable mechanism to permit selective movement of the radiation source 115, and one or more energy-shaping apparatuses (for example, beam-shaping apparatuses 117 such as jaws, multi-leaf collimators, and so forth) to provide selective energy shaping and/or energy modulation as desired.

In a typical application setting, it is presumed herein that the patient support apparatus 110 is selectively controllable to move in any direction (i.e., any X, Y, or Z direction) during an energy-based treatment session by the control circuit 101. As the foregoing elements and systems are well understood in the art, further elaboration in these regards is not provided here except where otherwise relevant to the description.

Figure 2:
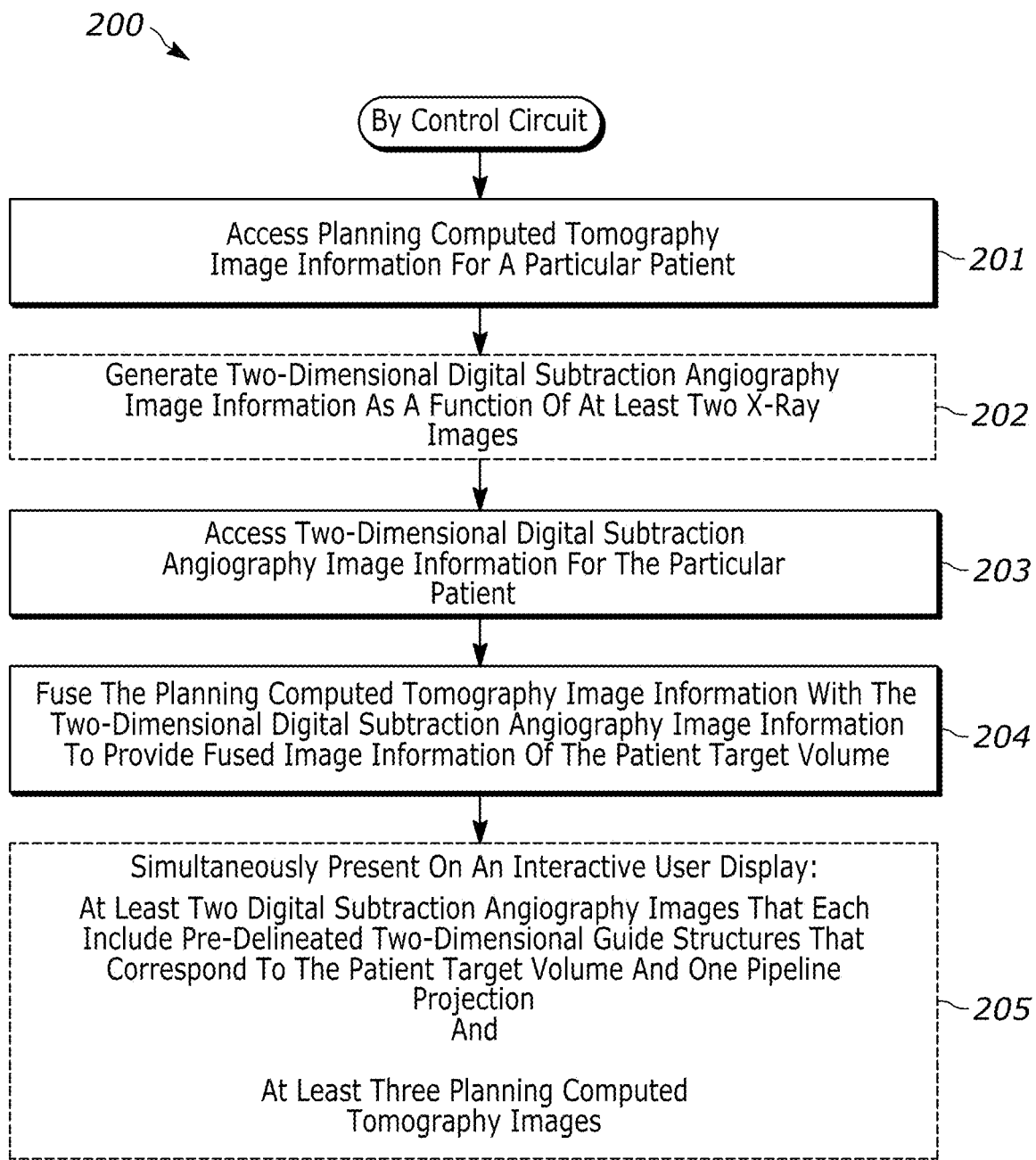
FIG. 2 comprises a flow diagram as configured in accordance with various embodiments of these teachings.

Referring now to FIG. 2, a process 200 that can be carried out, for example, in conjunction with the above-described application setting (and more particularly via the aforementioned control circuit 101) will be described. Generally speaking, this process 200 serves to facilitate generating an optimized radiation treatment plan 113 to thereby facilitate treating a particular patient with therapeutic radiation using a particular radiation treatment platform per that optimized radiation treatment plan.

For the sake of an illustrative example, the description provided herein presumes that the patient treatment volume comprises, at least in part, an arteriovenous malformation. External beam radiation treatment is one of the therapeutic modalities currently available to treat brain an arteriovenous malformation. It will be understood that these teachings are not limited to only this application setting.

At block 201, this process 200 provides for accessing planning computed tomography image information for a particular patient. Those skilled in the art will understand that a planning computed tomography image is typically a computed tomography image that is captured at a pre-treatment stage. Such images typically serve to capture both a patient's target volume and surrounding tissue/structures. By one approach, the planning computed tomography image information comprises, at least in part, segmented three-dimensional contours from corresponding computed tomography image information.

At optional block 202, this process 200 will provide for generating two-dimensional digital subtraction angiography image information as a function of at least two x-ray images. Digital subtraction angiography will be understood to typically comprise an image of blood vessels in the brain. Such an image often serves to help detect a problem with blood flow. The procedure can involve inserting a catheter into a leg artery and passing that catheter up to the blood vessels in the brain. A contrast dye is injected through the catheter and X-ray images are taken of the blood vessels. For the sake of the present description, it will be presumed that this digital subtraction angiography image information presents information regarding the aforementioned arteriovenous malformation in the patient's brain.

By one approach, these teachings will accommodate having the aforementioned two digital subtraction angiography images be images that are orthogonal to one another (or at least substantially orthogonal to one another—for example, with 0 to 10 degrees of true orthogonality).

At block 203, the control circuit 101 accesses two-dimensional digital subtraction angiography image information for the particular patient. This activity can comprise, by one approach, accessing the aforementioned information that is generated at optional block 202. By another approach, this activity can comprise accessing such information from another source. By one approach, the accessed two-dimensional digital subtraction angiography image information for the particular patient includes at least one closed two-dimensional contour surrounding an image of the patient target volume (such as the aforementioned arteriovenous malformation in the patient's brain) on each of at least two two-dimensional digital subtraction angiography images.

At block 204, the control circuit 101 then fuses the aforementioned planning computed tomography image information with the aforementioned two-dimensional digital subtraction angiography image information to provide fused image information of the patient target volume. By one approach, when the planning computed tomography image information comprises, at least in part, the aforementioned segmented three-dimensional contours from corresponding computed tomography image information, this fusing of the planning computed tomography image information with the two-dimensional digital subtraction angiography image information can comprise, at least in part, projecting the segmented three-dimensional contours into two-dimensional contours on the two-dimensional digital subtraction angiography image information.

By one approach, the aforementioned fusing of the planning computed tomography image information with the two-dimensional digital subtraction angiography image information can comprise, at least in part, and for each image pair of x-ray and planning computed tomography images, effecting a registration therebetween.

Figure 3:
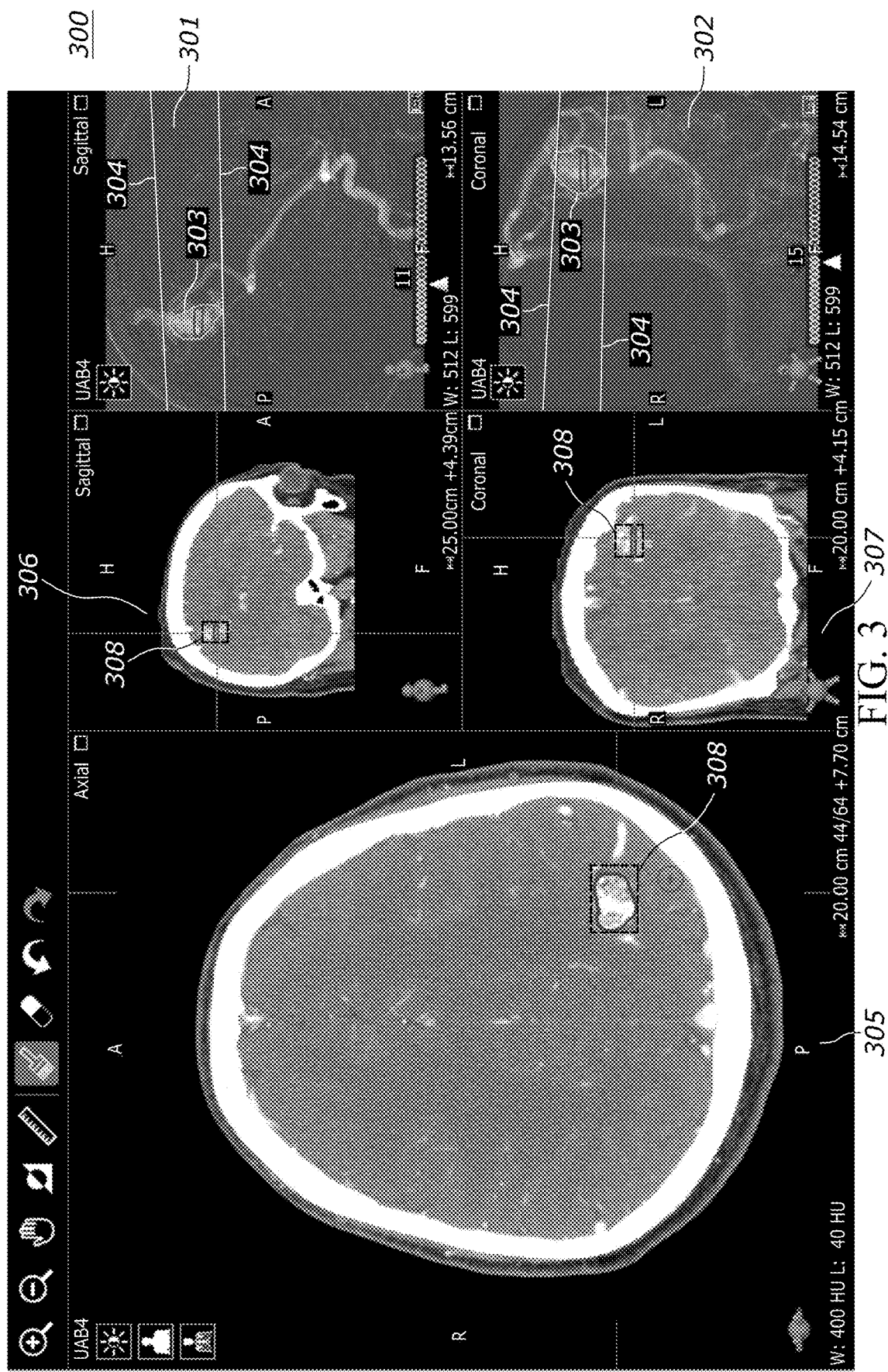
FIG. 3 comprises a screen shot as configured in accordance with various embodiments of these teachings.

These teachings are flexible in practice and will accommodate a variety of ways to leverage the foregoing resultant content. As one illustrative optional example in these regards, and without intending to suggest any limitations in these regards, at optional block 205 and referring now as well to FIG. 3, the control circuit 101 can simultaneously present, on an interactive display 300 (as comprises, for example, a part of the aforementioned user interface 103), two (or more) digital subtraction angiography images 301, 302 that each include pre-delineated two-dimensional guide structures 303 that correspond to the patient target volume and at least one pipeline projection 304 as well as at least three three-dimensional planning computed tomography images 305-307. Such images can greatly facilitate interaction with a user in order to best leverage the fused content.

By one approach, the aforementioned at least three three-dimensional planning computed tomography images can include an axial image 305, a sagittal image 306, and a coronal image 307. Also if desired, the at least three three-dimensional planning computed tomography images can each include a three-dimensional guide box 308 that is reconstructed from two-dimensional guide contours from at least two of the digital subtraction angiography images.

Additional details will now be provided by way of corresponding examples. It will again be understood that these examples are intended to serve an illustrative purpose and are not intended to suggest any particular limitations with respect to these teachings.

In this example, to better integrate two-dimensional digital subtraction angiography image series into the routine workflow when segmenting a three-dimensional arteriovenous malformation target in a planning computed tomography image, these teachings will accommodate interactively segmenting a three-dimensional arteriovenous malformation target from a three-dimensional data set with unique visual assistances side-by-side together with fused two-dimensional digital subtraction angiography images.

In this example, the arteriovenous malformation target is identified and determined (for example, by a neurosurgeon) according to the temporal blood flow information and angioarchitecture from the frames of the two-dimensional digital subtraction angiography image series that has been acquired from orthogonal or near orthogonal x-ray angles. The result is a closed two-dimensional contour on each of the digital subtraction angiography image series, which can then be used as a two-dimensional guide structure in subsequent steps.

Two frameless two-dimensional/three-dimensional rigid registrations can be performed independently, one for each image pair of x-ray/computed tomography images, in which the x-ray image has the same geometry setup as the corresponding digital subtraction angiography image series. Each result is that a geometry relation between the digital subtraction angiography image series and the planning computed tomography image is established. (Those skilled in the art will understand that a "frame" is a mechanical structure that serves to hold motionless a patient's head during image capture. The aforementioned reference to "frameless" therefore will be understood to refer to capturing the referenced images without the use of such a frame.)

When segmenting the three-dimensional arteriovenous malformation target from the planning computed tomography image, the planning computed tomography image can be displayed side-by-side with two-dimensional digital subtraction angiography images with the prior established registration. The two-dimensional guide structure can be displayed in the two-dimensional digital subtraction angiography image. In order to better integrate the angioarchitecture of the two-dimensional digital subtraction angiography image into the workflow, this example will accommodate implementing the following visual assistance to support interactively (i.e., with a user) segmenting a three-dimensional arteriovenous malformation target.

In this example, two pipelines can be generated in each of the two-dimensional digital subtraction angiography images to assist in defining the extent of the projection of a two-dimensional guide structure from the first two-dimensional digital subtraction angiography image to the second two-dimensional digital subtraction angiography image as well as to indicate the quality of two-dimensional/three-dimensional registration. By one approach, the calculation of the two projection lines can be based on the epipolar geometry of stereo vision. What are pipelines? (In this example, the aforementioned pipeline can comprise a displayed graphic element that is rendered on the displayed image. In this example, the pipeline can comprise a pair of non-parallel lines having an intersection point at a corresponding source.)

Referring to the aforementioned epipolar geometry, given a contour point in a first two-dimensional digital subtraction angiography image, a plane (also known as an epipolar plane) can be defined by the two x-ray source positions (or camera centers) and the given contour point. The intersection of the epipolar plane and the second two-dimensional digital subtraction angiography image plane defines the epipolar line. The projection position of the given contour point from the first two-dimensional digital subtraction angiography image lies on that epipolar line. Iterating over all the points in the contour of the guide structure from the first two-dimensional digital subtraction angiography image, these teachings can generate a set of such epipolar lines, all of which intersect at a common point (referred to as the epipole).

That epipole is the projection of the first x-ray source position in the second two-dimensional digital subtraction angiography image. The two projection lines of the guide structure from the first two-dimensional digital subtraction angiography image view represent the two outer-most epipolar lines found from the all-epipolar lines intersected with the second two-dimensional digital subtraction angiography image planes, and vice versa.

By one approach, these teachings will accommodate generating a three-dimensional guide box in the three-dimensional planning computed tomography image to indicate an approximate position and size of the arteriovenous malformation target.

By a first approach in these regards, two cones can be calculated. A first cone connects the sagittal x-ray image source with each point of the sagittal contouring of the two-dimensional guide structure. A second cone connects the frontal x-ray image source with each point of the frontal contouring of the two-dimensional guide structure. Both cones can then be cut off at the edge of the computed tomography image so that they form two frustums. A bounding box can then be calculated around each frustum. Where the two frustum bounding boxes intersect, an intersection bounding box can be calculated. (A bounding box can be calculated for performance reasons as doing so can reduce the number of candidate voxels for the guide box. The present teachings, however, can also be practiced without use of bounding boxes. For example, one can instead iterate over all voxels of the computed tomography image.)

To continue with the foregoing example, for each voxel inside the intersection bounding box within the computed tomography volume, two projection lines can be defined, such that one projection line connects the virtual x-ray source position of the frontal two-dimensional digital subtraction angiography image to the voxel, and another connects the virtual x-ray source position of the sagittal two-dimensional digital subtraction angiography image. The points of the intersection of the two projection lines with the corresponding two-dimensional digital subtraction angiography image plane (frontal or sagittal) can then be calculated. If both points of the intersection are located inside the contouring of the corresponding guide structure, the voxel intersected by the two projection lines within the computed tomography volume can be classified as part of the guide box structure.

If desired, these teachings will also support projecting three-dimensional contours to two-dimensional contours by using a triangle mesh algorithm. For example, a current three-dimensional target structure volume can be converted to a triangle mesh. That conversion can be based on the marching cube algorithm, which triangulates the isosurface of a volume from an implicit function (one of the form f(x, y, z)=0). The algorithm marches over a uniform grid of cubes (or voxels) superimposed over a region of the function. If all 8 vertices of the cube are positive, or all 8 vertices are negative, the cube is entirely above or entirely below the surface, and no triangles are emitted. Otherwise, the cube straddles the function, and some triangles and vertices are generated. Since each vertex can either be positive or negative, there are technically 256 possible configurations. For each cube, an index is calculated by comparing the pixel value at the cube vertices with the isosurface value. Using a cube index, one can look up the list of cube edges from a precalculated case table. Linear interpolation can then be used to determine the point of the isosurface intersection (or triangle vertex) along the cube edge. The final step of this approach can provide for calculating a unit normal for each triangle vertex. Rendering algorithms can then use the unit normal to produce smooth shading.

Figure 4:
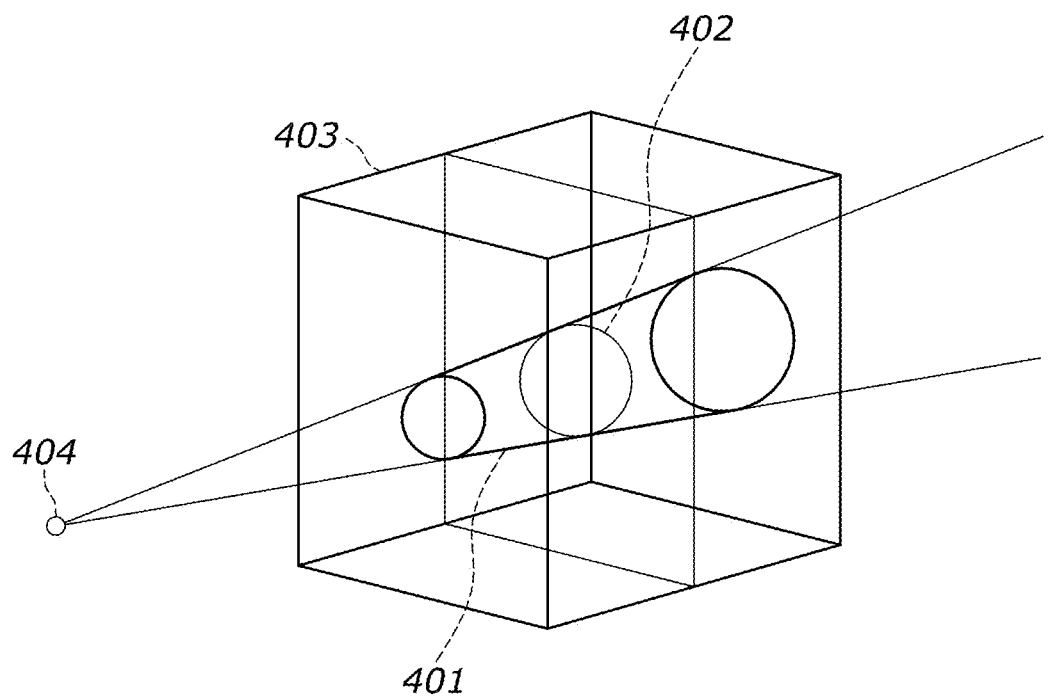
FIG. 4 comprises a graphical depiction as configured in accordance with various embodiments of these teachings.
Figure 5:
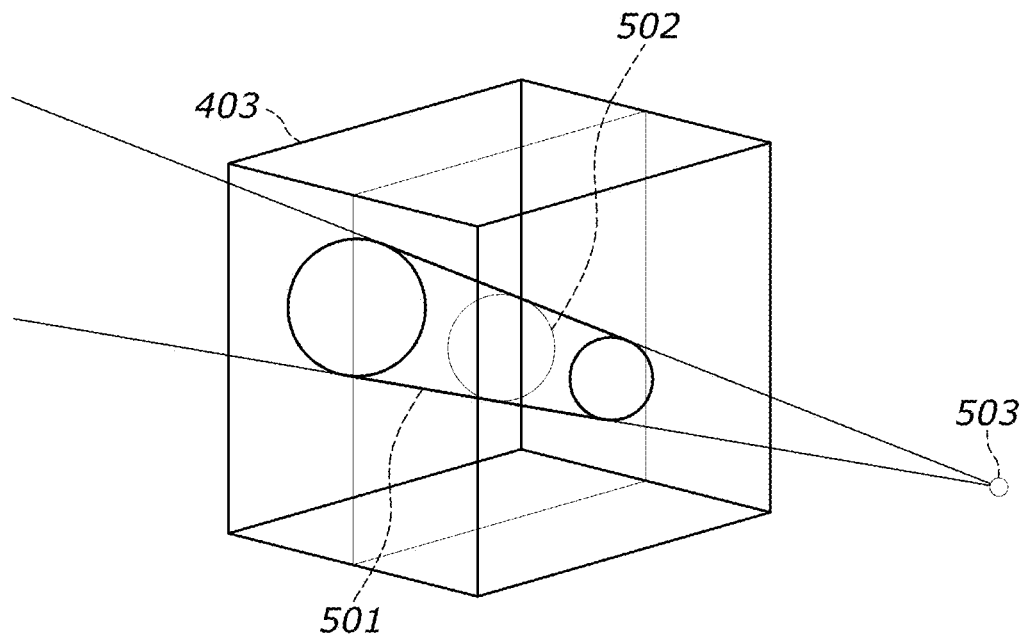
FIG. 5 comprises a graphical depiction as configured in accordance with various embodiments of these teachings.

As an alternative approach to generating a three-dimensional guide box, and referring now to both FIGS. 4 and 5, two three-dimensional projections of the two two-dimensional guide structures can be calculated. A three-dimensional projection 401 of the sagittal two-dimensional guide structure 402 consists of the points inside the computed tomography volume 403 which lay inside the projected cone given by projecting the sagittal two-dimensional guide 402 structure with the sagittal x-ray image source 404 as center of projection. Similarly, a three-dimensional projection 501 of the frontal two-dimensional guide structure 502 consists of the voxels inside the computed tomography volume 403 which lay inside the projected cone given by projecting the frontal two-dimensional guide structure 502 with the frontal x-ray image source 503 as center of projection.

Figure 6:
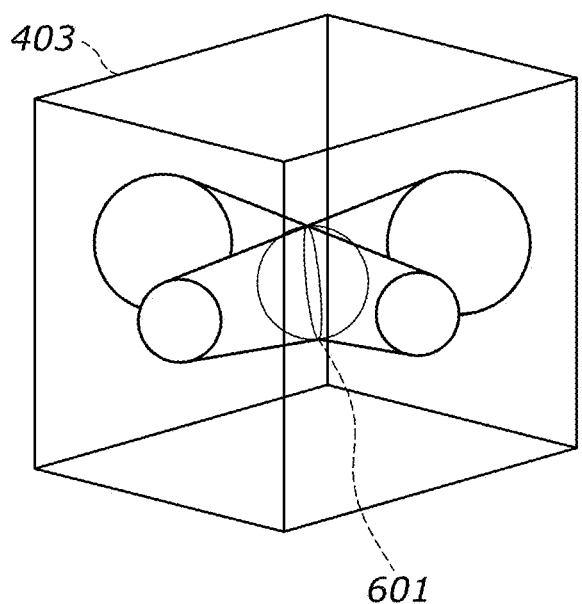
FIG. 6 comprises a graphical depiction as configured in accordance with various embodiments of these teachings.

Referring now to FIG. 6, a corresponding three-dimensional guide box 601 can then be calculated by performing an intersection of the two three-dimensional projections of the two two-dimensional guide structures. A point inside the computed tomography volume 403 is classified as part of the three-dimensional guide box if it is in both the sagittal and frontal three-dimensional projections.

Following proper segmentation of the target, information regarding the segmented target can then be used in ordinary course to optimize a radiation-based treatment plan, following which therapeutic radiation can be administered to the patient using that optimized radiation-based treatment plan and, for example, the aforementioned radiation treatment platform 114 described above.

Accordingly, by one approach, these teachings can successfully leverage one volumetric computed tomography image and two pairs of X-ray images (i.e. a total of four X-ray images). Each digital subtraction angiography image can be generated out of two X-ray images, which are taken from the same position but at different points in time. One of the two X-ray images can also be used to effect the image fusion with the volumetric computed tomography image. This cannot be done with the digital subtraction angiography image, but the resulting registration can be applied to the digital subtraction angiography image as well, because it has the same orientation in space as its underlying pair of X-ray images. By one approach the total process can use two independent image fusions with the volumetric computed tomography image, where the two digital subtraction angiography images (i.e., the underlying pairs of involved X-ray images) are more or less orthogonal to each other.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A method to facilitate segmenting a patient target volume in support of radiation treatment planning, the method comprising:
   by a control circuit:
      accessing planning computed tomography image information for a particular patient;
      accessing two-dimensional digital subtraction angiography image information for the particular patient;
      fusing the planning computed tomography image information with the two-dimensional digital subtraction angiography image information to provide fused image information of the patient target volume.

2. The method of claim 1 wherein the patient target volume comprises, at least in part, an arteriovenous malformation.

3. The method of claim 1 wherein the planning computed tomography image information comprises, at least in part, segmented three-dimensional contours from corresponding computed tomography image information and wherein fusing the planning computed tomography image information with the two-dimensional digital subtraction angiography image information comprises, at least in part, projecting the segmented three-dimensional contours into two-dimensional contours on the two-dimensional digital subtraction angiography image information.

4. The method of claim 1 further comprising:
   generating the two-dimensional digital subtraction angiography image information as a function of at least two x-ray images.

5. The method of claim 4 wherein the at least two x-ray images include two images that are at least substantially orthogonal to one another.

6. The method of claim 1 wherein the two-dimensional digital subtraction angiography image information for the particular patient includes at least one closed two-dimensional contour surrounding an image of the patient target volume on each of at least two two-dimensional digital subtraction angiography images.

7. The method of claim 1 wherein fusing the planning computed tomography image information with the two-dimensional digital subtraction angiography image information comprises, at least in part, and for each image pair of x-ray and planning computed tomography images, effecting a registration therebetween.

8. The method of claim 1 further comprising:
simultaneously presenting on an interactive user display:
at least two digital subtraction angiography images that each include pre-delineated two-dimensional guide structures that correspond to the patient target volume and at least one pipeline projection;
at least three three-dimensional planning computed tomography images.

9. The method of claim 8, wherein the at least three three-dimensional planning computed tomography images include an axial image, a sagittal image, and a coronal image.

10. The method of claim 8, wherein the at least three three-dimensional planning computed tomography images each include a three-dimensional guide box that is reconstructed from two-dimensional guide contours from at least two of the digital subtraction angiography images.

11. An apparatus to facilitate segmenting a patient target volume in support of radiation treatment planning, the apparatus comprising:
a control circuit configured to:
access planning computed tomography image information for a particular patient;
access two-dimensional digital subtraction angiography image information for the particular patient;
fuse the planning computed tomography image information with the two-dimensional digital subtraction angiography image information to provide fused image information of the patient target volume.

12. The apparatus of claim 11 wherein the patient target volume comprises, at least in part, an arteriovenous malformation.

13. The apparatus of claim 11 wherein the planning computed tomography image information comprises, at least in part, segmented three-dimensional contours from corresponding computed tomography image information and wherein the control circuit is configured to fuse the planning computed tomography image information with the two-dimensional digital subtraction angiography image information by, at least in part, projecting the segmented three-dimensional contours into two-dimensional contours on the two-dimensional digital subtraction angiography image information.

14. The apparatus of claim 11 wherein the control circuit is further configured to: generate the two-dimensional digital subtraction angiography image information as a function of at least two x-ray images.

15. The apparatus of claim 14 wherein the at least two x-ray images include two images that are at least substantially orthogonal to one another.

16. The apparatus of claim 11 wherein the two-dimensional digital subtraction angiography image information for the particular patient includes at least one closed two-dimensional contour surrounding an image of the patient target volume on each of at least two two-dimensional digital subtraction angiography images.

17. The apparatus of claim 11 wherein the control circuit is configured to fuse the planning computed tomography image information with the two-dimensional digital subtraction angiography image information by, at least in part, and for each image pair of x-ray and planning computed tomography images, effecting a registration therebetween.

18. The apparatus of claim 11 wherein the control circuit is further configured to:
simultaneously present on an interactive user display:
at least two digital subtraction angiography images that each include pre-delineated two-dimensional guide structures that correspond to the patient target volume and at least one pipeline projection;
at least three three-dimensional planning computed tomography images.

19. The apparatus of claim 18, wherein the at least three three-dimensional planning computed tomography images include an axial image, a sagittal image, and a coronal image.

20. The apparatus of claim 18, wherein the at least three three-dimensional planning computed tomography images each include a three-dimensional guide box that is reconstructed from two-dimensional guide contours from at least two of the digital subtraction angiography images.

* * * * *